US009435531B2

(12) United States Patent
Kobayashi et al.

(10) Patent No.: US 9,435,531 B2
(45) Date of Patent: Sep. 6, 2016

(54) DISPLAY APPARATUS (71) Applicants: DENSO CORPORATION, Kariya, Aichi-pref. (JP); Honda Motor Co., Ltd., Tokyo (JP)

(72) Inventors: Yasuhiro Kobayashi, Okazaki (JP); Masahiro Kuno, Kariya (JP); Shinji Kamon, Wako (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 7 days.

(21) Appl. No.: 14/277,201

(22) Filed: May 14, 2014

(65) Prior Publication Data
US 2014/0340867 A1 Nov. 20, 2014

(30) Foreign Application Priority Data

May 15, 2013 (JP) .................. 2013-103187

(51) Int. Cl.
*B60Q 1/00* (2006.01)
*F21V 33/00* (2006.01)
(Continued)

(52) U.S. Cl.
CPC .......... *F21V 33/0052* (2013.01); *G01D 11/28* (2013.01); *G02B 6/001* (2013.01); *G02B 6/0046* (2013.01); *G02B 6/0076* (2013.01)

(58) Field of Classification Search
CPC .... B60Q 3/0289; B60Q 1/0011; B60Q 3/04; B60Q 3/022; B60K 2350/408; B60K 2350/2039; B60K 2350/2095; B60K 2350/402
USPC .................................. 362/489, 511
See application file for complete search history.

(56) References Cited

U.S. PATENT DOCUMENTS 7,575,331 B2 * 8/2009 Birman et al. ................ 362/511
2005/0212721 A1 9/2005 Kuwahara et al.
(Continued)

FOREIGN PATENT DOCUMENTS

DE     101 45 036     4/2003
JP     2001-021389     1/2001
(Continued)

OTHER PUBLICATIONS

Extended European Search Report dated Nov. 5, 2014 corresponding European Application No. 14166032.4.
(Continued)

*Primary Examiner* — William Carter
(74) *Attorney, Agent, or Firm* — Harness, Dickey & Pierce, P.L.C.

(57) ABSTRACT

A display apparatus provides a display region to display information, and a peripheral light luminous region to output light. The display apparatus includes an indicator light source and a coloring transmissive member made of light transmissive material. The coloring transmissive member includes a light input face where the light emitted from the indicator light source enters; a light output face with a belt-like shape in an extended direction to form the light luminous region by outputting light inputted from the light input face; and an attenuation portion attenuating light transmitting from the light input face to the light output face. The attenuation portion has a thickness between the light input face and the light output face. The thickness changes to increase in the extended direction of the light output face as going from a central portion towards each of both end portions.

12 Claims, 5 Drawing Sheets (51) Int. Cl.
*F21V 8/00* (2006.01)
*G01D 11/28* (2006.01)

(56) References Cited

U.S. PATENT DOCUMENTS

2006/0144318 A1\* 7/2006 Balsfulland et al. ......... 116/288
2007/0186843 A1\* 8/2007 Tsurumi ............... G01D 13/265
116/286

FOREIGN PATENT DOCUMENTS

| JP | 2005-257794 | 9/2005 |
| JP | 2005-308622 | 11/2005 |
| JP | 2006-047271 | 2/2006 |
| JP | 2007-218694 | 8/2007 |
| JP | 2009-069087 | 4/2009 |

OTHER PUBLICATIONS

Office Action issued Mar. 17, 2015 in corresponding JP Application No. 2013-103187 (with English translation).

Office Action dated Feb. 3, 2016 issued in the corresponding CN application No. 2014 1030 6438.2 in Chinese with English translation.

\* cited by examiner

DISPLAY APPARATUS

CROSS REFERENCE TO RELATED APPLICATION

The present application is based on Japanese Patent Application No. 2013-103187 filed on May 15, 2013, the disclosure of which is incorporated herein by reference.

TECHNICAL FIELD

The present disclosure relates to a display apparatus to display information.

BACKGROUND ART

[Patent Literature 1] JP 2006-047271 A

For instance, Patent Literature 1 describes an instrument panel provided with a liquid crystal display apparatus to display information. The liquid crystal display apparatus can be recognized by a viewer through an opening portion made of light transmissive texture provided in a meter dial plate. The opening portion in the meter dial plate has a peripheral edge provided with a gradation layer with printing or transfer.

The Inventors examined the use of such gradation with printing described in Patent Literature 1 to a design in a display apparatus. That is, the gradation with printing is applied to a light output face having a belt-like shape in an extended direction to enable a light luminous region formed by the light output face to provide a luminance that decreases in the extended direction from a central portion to each of both end portions. The Inventors however found it difficult for the gradation with printing to provide a smooth or continuous change in luminance of the light luminous region for the following reason.

To be specific, the above printing achieves the gradation by changing the magnitude or density of dots obscuring light. The printing generally limits the number of gradation steps to be expressed or achieved. As a result, when the printing is applied to a light output face so as to express the gradation of light and shade in an extended direction, the change of light and shade is apt to be in a stepwise expression. This eventually causes the change in quantity of the light outputted from the extended direction of the light output face to be stepwise. Thus, the printing seems to be difficult to express the gradation which decreases luminance smoothly or continuously in the light luminous region.

SUMMARY

It is an object of the present disclosure to provide a display apparatus that permits a light luminous region to change gradation of light and shade in a smooth or continuous expression.

To achieve the above object, according to an example of the present disclosure, a display apparatus is provided with a display region to display information and a light luminous region to output light while including a light source to emit light and a transmissive member made from light transmissive material. The transmissive member includes a light input face that receives the light emitted from the light source, a light output face that which has a belt-like shape in an extended direction to form the light luminous region by outputting the light inputted via the light input face, and an attenuation portion arranged between the light input face and the light output face to attenuate the light transmitting from the light input face to the light output face. The attenuation portion has a thickness between the light input face and the light output face such that the thickness changes to increase in the extended direction of the light output face from a central portion to each of end portions.

Under such a configuration, the thickness of the attenuation portion formed in between the light input face and the light output face is provided to change as continuously increasing or becoming larger from a central portion to each of both end portions of the belt-like shape in the extended direction. This permits the function of attenuating the light transmitting from the light input face to the light output face to demonstrate more effectively or strongly as going to each of both the end portions of the light output face. The above configuration thus enables the light quantity of the output light outputted from the light output face to decrease smoothly or continuously from the central portion to the end portion in the extended direction. Therefore, the light luminous region provided by the light output face can appear with the gradation which decreases luminance smoothly from the central portion to each of both the end portions.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following describes an embodiment of the present disclosure with reference to drawings.

Figure 1:
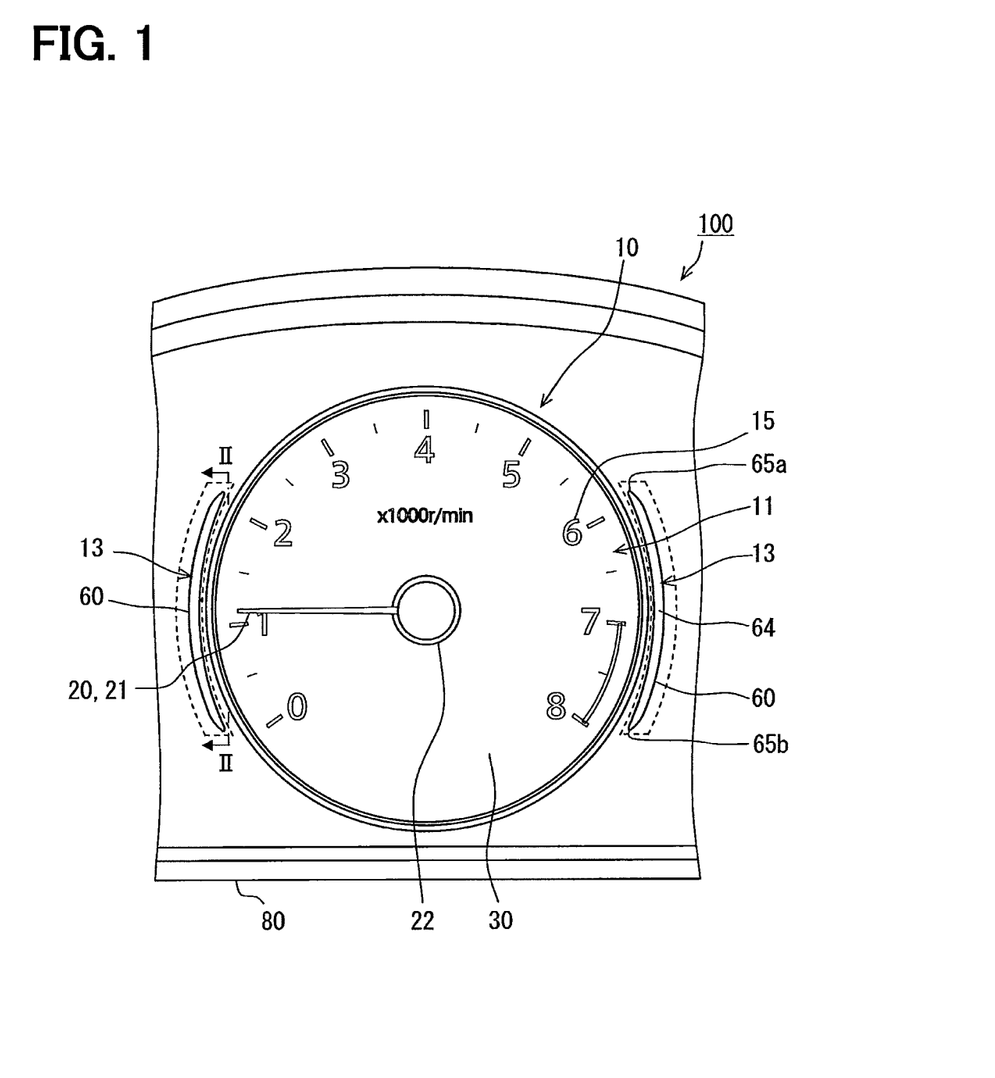
FIG. 1 is a front view of a combination meter according to an embodiment of the present disclosure.
Figure 2:
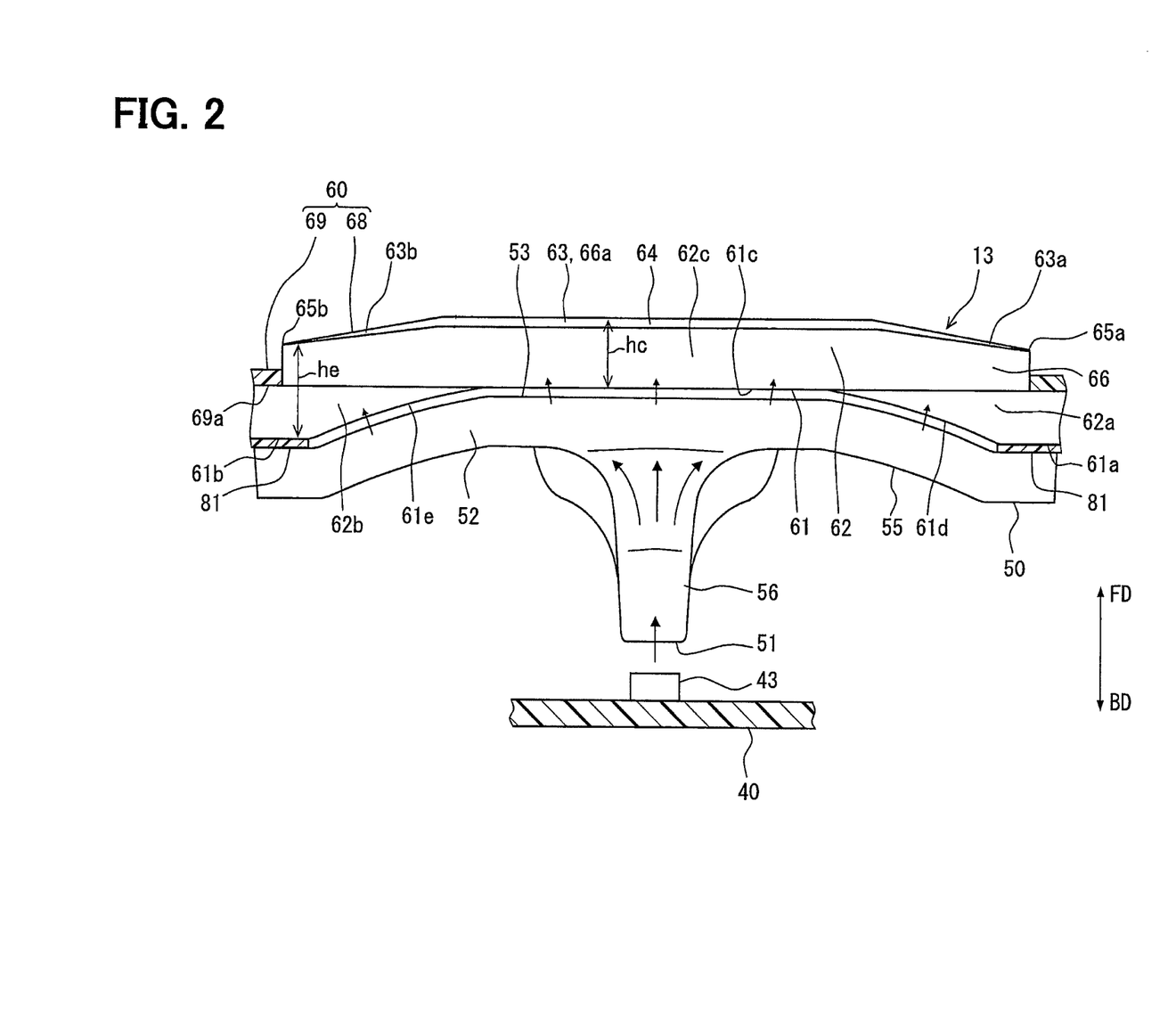
FIG. 2 is a cross-sectional view of a semi-transmissive prism and an indicator-light guide member, taken along the line II-II in FIG. 1.

A combination meter 100 according to an embodiment of the present disclosure is contained in an instrument panel in a vehicle compartment of a subject vehicle such that the front side illustrated in FIG. 1 faces a driver's seat of the subject vehicle. The combination meter 100 is a vehicular display apparatus which displays a variety of information about the subject vehicle. The combination meter 100 includes several meters such as a tachometer 10 and other meters (unshown) of a speedometer, a water thermometer, a fuel gauge, and the like.

The tachometer 10 displays the information of rotation speed of an output axis of an internal-combustion engine mounted in the subject vehicle on a display region 11. The display of the tachometer 10 is configured by a combination of (i) the display region 11 and (ii) a peripheral light luminous region 13, which is arranged to be adjacent to an outer perimeter or circumference of the display region 11. The following defines the direction where the display region 11 demonstrates or outputs a display as a front direction (FD) or a display direction of the combination meter 100, and defines the direction opposite to the front direction or display direction as a back direction (BD), as illustrated in FIG. 2.

First, the information display by the display region 11 is explained with reference to FIG. 1.

The display region 11 contains a display plate 30 and a pointer 20 which rotates along the surface of the display plate 30. The display plate 30 has a disc-like shape using a light transmissive resin material such as a polycarbonate resin. The display plate 30 forms design portions 15 by applying light shielding printing to regions other than the design portions 15; the design portions 15 include numeric characters of Arabic numerals indicating the rotation speed of the output axis of the engine, for instance. The display plate 30 transmits the light from the back side (BD) to the front side (FD) via the design portions 15 to permit the design portions 15 to provide a luminous display.

The pointer 20 is configured by a combination of a pointer portion 21 made of light transmissive resin material, and a cap portion 22 made of light shielding resin material. The pointer portion 21 is extended in a radial direction from a center portion towards an outer perimeter of the display plate 30. The cap portion 22 is located at the center portion of the display plate 30 so as to cover an originating end portion of the pointer portion 21. The pointer portion 21 transmits the inputted light to the front side (FD) so as to provide a luminous display.

The following explains an indicator display by the peripheral light luminous region 13.

Figure 3:
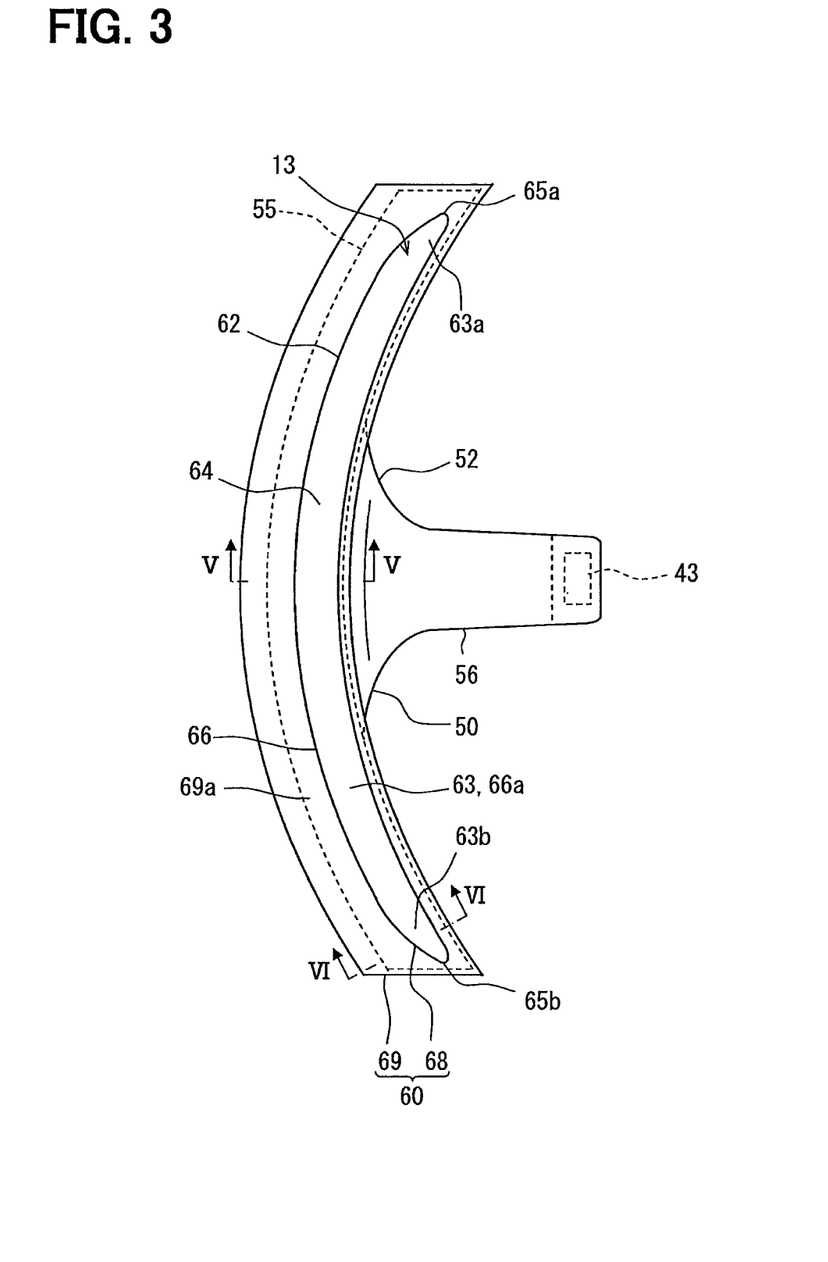
FIG. 3 is a schematic view of a semi-transmissive prism and an indicator-light guide member.

The peripheral light luminous region 13 changes a luminescent color depending on the rotation speed of the output axis, for example, thereby providing an ambient display of the information on rotation speed in a peripheral visual field of a viewer. The peripheral light luminous region 13 includes a semi-transmissive prism 60. With reference to FIGS. 2 and 3, an indicator-light guide member 50 guides light to the semi-transmissive prism 60; then, the semi-transmissive prism 60 outputs the light. The peripheral light luminous region 13 thereby provides a luminous display.

With reference to FIG. 1, two semi-transmissive prisms 60 are arranged in a left side and a right side (i.e., both sides in a horizontal direction) of the display region 11, respectively. The peripheral light luminous region 13 formed by the semi-transmissive prism 60 is curved in an arc-like shape along an outer perimeter or an outline of the display region 11. The semi-transmissive prism 60 includes a light input face 61 and a light output face 63, as indicated in FIGS. 2 and 3.

The light input face 61 is formed in the rear face located in the back direction BD of the semi-transmissive prism 60. The light input face 61 faces the indicator-light guide member 50. The light input face 61 receives light outputted from the indicator-light guide member 50 to input it to the semi-transmissive prism 60. The light output face 63 is formed in the front face located in the front direction FD of the semi-transmissive prism 60. The light output face 63 has a belt-like shape in an extended direction so as to be along an outer edge portion of an outer perimeter of the display plate 30 (refer to FIG. 1). The light output face 63 transmits the light, which enters the semi-transmissive prism 60 via the light input face 61, to thereby provide the periphery light luminous region 13.

The indicator-light guide member 50 is made of light transmissive resin material such as an acrylic resin. The indicator-light guide member 50 is arranged on the back direction BD of the semi-transmissive prism 60. The indicator-light guide member 50 is provided to face the light input face 61 so as to diffuse the light emitted from an indicator light source 43 mentioned later. The indicator-light guide member 50 includes (i) a light guide main body portion 55 having a plate-like shape along the light input face 61, and (ii) a light guide projection portion 56 projected in a projected direction along the back direction BD from the light guide main body portion 55 to the indicator light source 43. The indicator-light guide member 50 also includes an indicator-light input portion 51, an indicator-light diffusion portion 52, and an indicator-light output portion 53.

The indicator-light input portion 51 is formed at a tip of the light guide projection portion 56 in the projected direction. The indicator-light input portion 51 is located to face the indicator light source 43 in the front direction FD of the indicator light source 43. The indicator-light input portion 51 transmits the light emitted from the indicator light source 43 to the indicator-light guide member 50. The indicator-light diffusion portion 52 is formed to range from the light guide projection portion 56 to the light guide main body portion 55. The indicator-light diffusion portion 52 diffuses light transmitting from the light guide projection portion 56 to the light guide main body portion 55 and permits the light to reach the indicator-light output portion 53. The indicator-light output portion 53 is formed in a front face in the front direction FD in the light guide main body portion 55. The indicator-light output portion 53 opposes the light input face 61. The indicator-light output portion 53 outputs the light, which is made to be uniform by the indicator-light diffusion portion 5, to the light input face 61.

Figure 4:
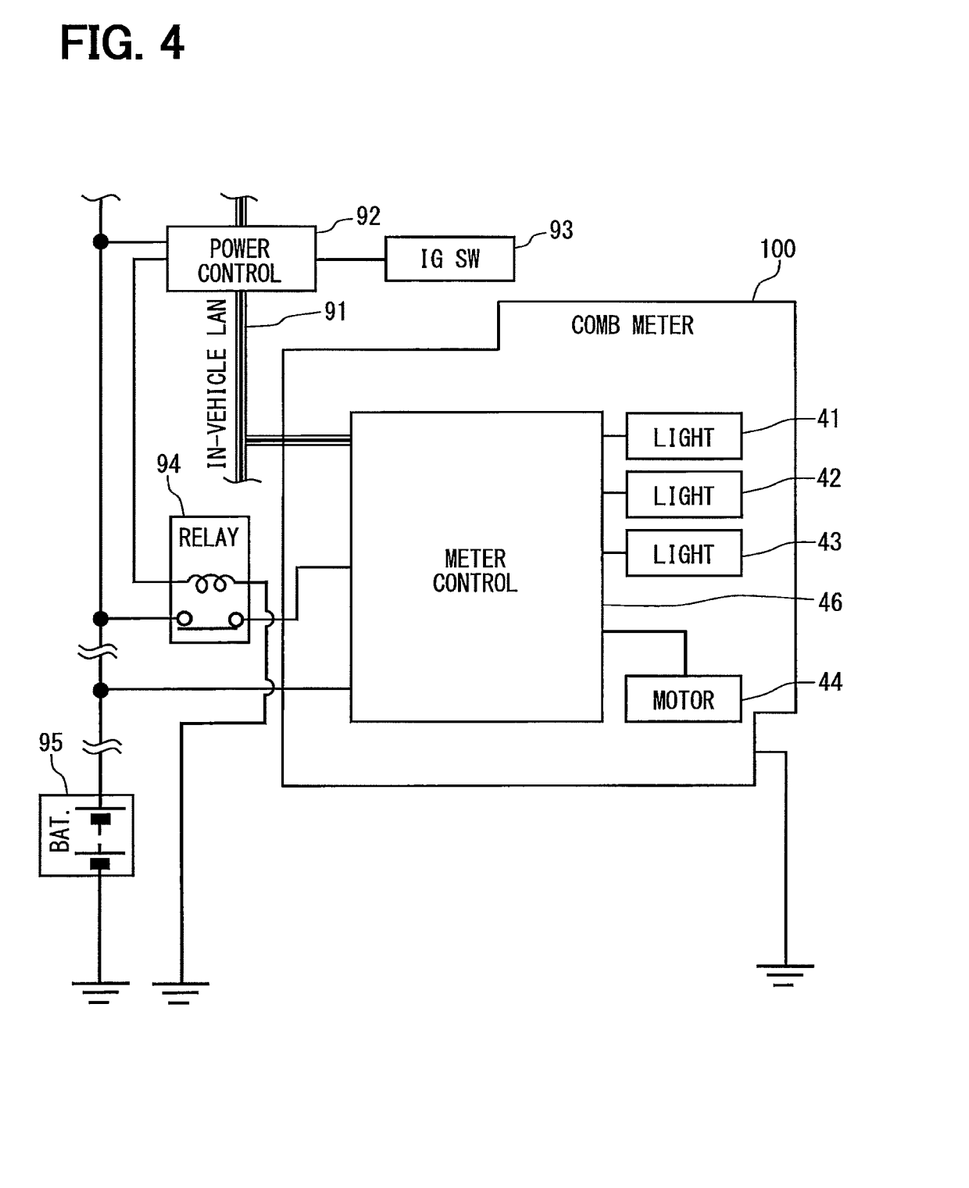
FIG. 4 is a block diagram illustrating an electrical configuration of a combination meter.

The following explains an electrical configuration of the combination meter 100 with reference to FIGS. 2 and 4. The combination meter 100 is mounted in a circuit board 40, and includes the electrical components such as a pointer light source 41, a display plate light source 42, a indicator light source 43, a stepper motor 44, and a meter control portion 46. It is noted that FIG. 2 illustrates only the indicator light source 43 while omitting other components.

The pointer light source 41, the display plate light source 42, and the indicator light source 43 are configured by several light emitting diodes, for instance. The pointer light source 41 is a light source which emits light which makes the pointer portion 21 (refer to FIG. 1) luminous. The display plate light source 42 is a light source which emits light which makes the design portions 15 (refer to FIG. 1) luminous. The indicator light source 43 is a light source which emits light which makes the peripheral light luminous region 13 luminous. Each light source 41 to 43 is connected to the meter control portion 46, and emits light based on drive signals outputted from the meter control portion 46.

The stepper motor 44 has a mechanism which rotates the pointer 20. The stepper motor 44 is connected to the meter control portion 46, and rotates the pointer 20 based on drive signals outputted from the meter control portion 46.

The meter control portion 46 includes a microcomputer which operates based on programs. The meter control portion 46 is connected with an in-vehicle local area network (LAN) 91, an external battery 95, and an ignition relay 94. Furthermore, the in-vehicle LAN 91 is connected to a power control circuit 92. The power control circuit 92 in the in-vehicle LAN 91 detects a depression manipulation to an ignition switch 93 by the driver, applies voltage to the ignition relay 94, to switch the ignition relay 94 into a current-applied state. Then, the meter control portion 46 controls light emission of the respective light sources 41 to 43 based on drive signals. In addition, the meter control portion 46 controls rotation displacement of the pointer 20 by the stepper motor 44 based on control signals. Under the above configuration, the combination meter 100 permits the tachometer 10 to provide a pointer display (see FIG. 1) depending on rotation speeds.

The following explains a configuration of the semi-transmissive prism 60 making the peripheral light luminous region 13 luminous in the above combination meter 100 with reference to FIGS. 2, 3, 5, and 6. The following defines the front direction FD as a direction of a thickness of the semi-transmissive prism 60.

As indicated in FIGS. 2 and 3, the semi-transmissive prism 60 is formed of two color molding of a light transmissive resin material and a light shielding resin material. The semi-transmissive prism 60 includes (i) a coloring transmissive member 68 made from light transmissive resin material and (ii) a light shielding member 69 made from light shielding resin material.

The coloring transmissive member 68 is made from smoked material such as an acrylic resin colored with pale black (gray), for example, and absorbs a part of incident light. Thereby, the coloring transmissive member 68 can attenuate the light to transmit. In addition, the coloring transmissive member 68 as well as the light output face 63 and the light input face 61 is provided as being integrated with the attenuation portion 62. Furthermore, the coloring transmissive member 68 is provided with an arc-like projection wall 66.

The light output face 63 has a belt-like shape in an extended direction along the edge of the display plate 30 (refer to FIG. 1); the light output face 63 appears in a crescent shape viewed from the front side. This light output face 63 includes a central portion 64 and tip tapering regions 63a and 63b. The central portion 64 is located in a central part in the extended direction of the light output face 63. The width of the light output face 63 in the central portion 64 is substantially constant. Each of the tip tapering regions 63a and 63b is located at each of both the sides of the central portion 64 in the extended direction of the light output face 63, and is connected directly with the central portion 64. The width of each tip tapering region 63a and 63b decreases as a distance from the central portion 64 increases. Thus, the width of the light output face 63 becomes narrower gradually towards each of both the end portions 65a and 65b.

The light input face 61 is located to oppose the light output face 63 while the attenuation portion 62 is sandwiched by both the light input face 61 and the light output face 63 as indicated in FIG. 2. The light input face 61 is curved to be arc-like and extended to be belt-like along the light output face 63. The light input face 61 includes a central portion 61c, both end regions 61a and 61b, and both intermediate regions 61d and 61e.

The central portion 61c of the light input face 61 is located to oppose the central portion 64 of the light output face 63 while the attenuation portion 62 is sandwiched by both the central portion 61c and the central portion 64. The central portion 61c is a flat face or plane which is substantially orthogonal to the front direction FD. Both the end regions 61a and 61b of the light input face 61 are located to oppose both the respective end portions 65a and 65b while the attenuation portion 62 is sandwiched between both the end regions 61a and 61b and both the end portions 65a and 65b. Both the end regions 61a and 61b are located in the back direction BD from the central portion 61c. Both the end regions 61a and 61b are covered with respective input-light shielding portions 81. The input-light shielding portions 81 are formed of a case member included in a housing 80 containing each component of the combination meter 100. The input-light shielding portion 81 is sandwiched between the indicator-light output portion 53 and each of both the end regions 61a and 61b. The input-light shielding portion 81 prevents light from entering each of both the end regions 61a and 61b.

The intermediate regions 61d and 61e of the light input face 61 are located to oppose the respective tip tapering regions 63a and 63b of the light output face 63 while the attenuation portion 62 is sandwiched between the intermediate regions 61d and 61e and the tip tapering regions 63a and 63b. The intermediate regions 61d and 61e connect continuously between the central portion 61c and each of both end regions 61a and 61b. One intermediate region 61d becomes more distant from the tip tapering region 63a, which the intermediate region 61d opposes in a thickness direction, as going to the end region 61a. The other intermediate region 61e becomes more distant from the tip tapering region 63b, which the intermediate region 61e opposes in a thickness direction, as going to the end region 61b.

Figure 5:
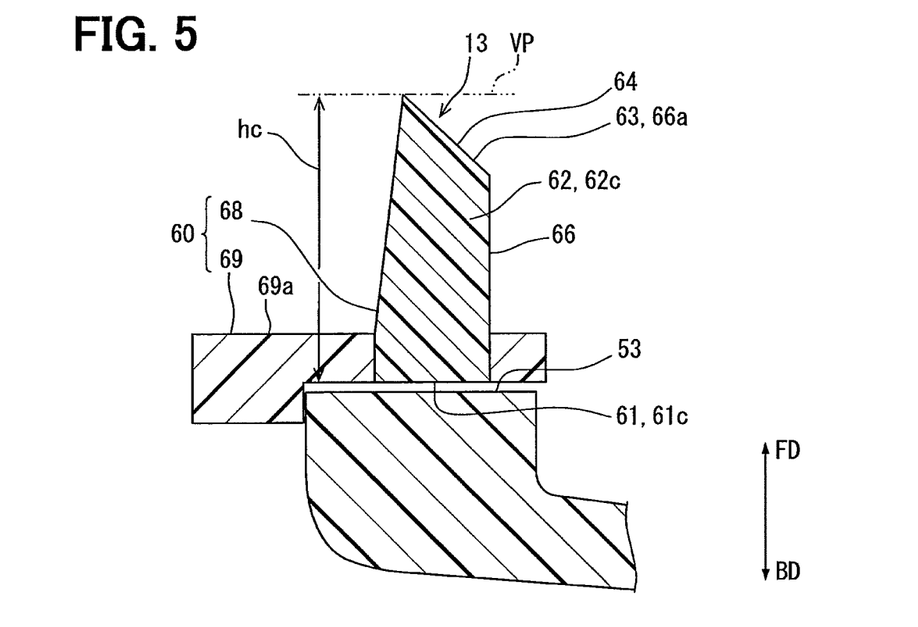
FIG. 5 is a cross-sectional view taken along the line in V-V in FIG. 3.
Figure 6:
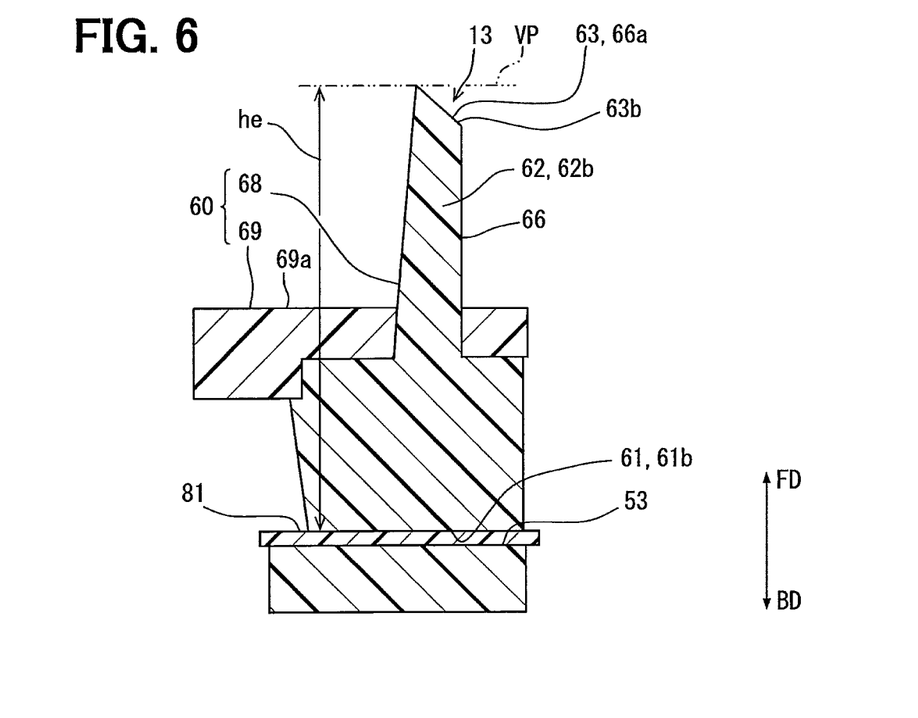
FIG. 6 is a cross-sectional view taken along the line in VI-VI in FIG. 3.

As indicated in FIGS. 2, 5, and 6, the attenuation portion 62 is formed in between the light input face 61 and the light output face 63. The attenuation portion 62 attenuates the light which goes from the light input face 61 to the light output face 63 using the characteristic of attenuating light due to the coloring transmissive member 68. The attenuation portion 62 includes a central portion 62c and both end portions 62a and 62b. The central portion 62c of the attenuation portion 62 is located between the central portion 64 of the light output face 63 and the central portion 61c of the light input face 61. One end portion 62a of the attenuation portion 62 is located between (i) the tip tapering region 63a and (ii) the intermediate region 61d and the end region 61a. The other end portion 62b of the attenuation portion 62 is located between (i) the tip tapering region 63b and (ii) the intermediate region 61e and the end region 61b. The attenuation portion 62 has a thickness that is defined as a length in between the light input face 61 and the light output face 63; the thickness is changed to increase or become larger along the extended direction of the light output face 63 from the central portion 64 towards each of both end portions 65a, 65b. To be specific, the thickness of the central portion 62c is substantially constant (see "hc" in FIGS. 2 and 5). In contrast, the thickness of one end portion 62a increases gradually as a distance from the central portion 62c increases. Similarly, the thickness of the other end portion 62b increases gradually as a distance from the central portion 62c increases (see "he" in FIGS. 2, 6). As explained above, each end portion 62a and 62b of the attenuation portion 62 has a thickness larger than that of the central portion 62c. This configuration permits the function of attenuating the light going from the light input face 61 to the light output face 63 to become more effective as going towards each end portion 65a and 65b.

As indicated in FIGS. 3, 5, and 6, the arc-like projection wall 66 is formed so as to project from the output-light shielding portion 69a of the light shielding member 69 in the front direction FD. In other words, the arc-like projection wall 66 penetrates the output-light shielding portion 69a in the thickness direction. The arc-like projection wall 66 is extended in an arc-like shape along the edge of the display plate 30. The arc-like projection wall 66 has a summit face 66a of a tip in a projected direction; the summit face 66a forms or provides the light output face 63. The summit face 66a is provided to incline against a virtual plane VP orthogonal to the front direction FD. To be specific, the summit face 66a provides a degree of inclination that becomes greater in the back direction BD as going closer towards the display plate 30 that is located at an inner side of the arc-like shape of the wall 66 (see FIGS. 5 and 6).

The light shielding member 69 appears from a viewer to be surrounding the peripheral light luminous region 13. The light shielding member 69 includes an output-light shielding portion 69a. The output-light shielding portion 69a is extended in a band plate-like shape surrounding the peripheral light luminous region 13, so as to surround all the perimeter of the originating end portion of the arc-like projection wall 66. The output-light shielding portion 69a shields all the region of the coloring transmissive member 68 excluding the arc-like projection wall 66 so that the shielded region is prevented from transmitting light to the front direction FD.

According to the configuration explained above, as illustrated in FIG. 2, the light emitted from the indicator light source 43 enters the indicator-light guide member 50 via the indicator-light input portion 51. The indicator-light guide member 50 diffuses the light and transmits the diffused light to the light input face 61 via the indicator-light output portion 53. The light transmitted from the indicator-light output portion 53 enters the coloring transmissive member 68 via the central portion 61c and the intermediate regions 61d and 61e excluding both the end regions 61a and 61b shielded by the input-light shielding portion 81, in the light input face 61.

Of the light entering the coloring transmissive member 68, first light which transmits through the central portion 62c of the attenuation portion 62 in the front direction FD remains in a state receiving attenuation slightly due to a small thickness of the attenuation portion 62 that the first light transmits through. In contrast, second light which transmits through both the end portions 62a and 62b of the attenuation portion 62 in the front direction FD receives attenuation significantly due to a large thickness of the attenuation portion 62 that the second light transmits through. In addition, according to the configuration where the thickness of the attenuation portion 62 changes continuously to be larger as going towards each of both the end portions 62a and 62b, the effect of the attenuation is demonstrated more significantly or strongly as going towards each of both the end portions 65a and 65b of the light output face 63 (i.e., as a distance from the central portion 64 becomes longer towards each of both the end portions 65a and 65b). This configuration enables the light quantity of the light outputted from the light output face 63 to decrease smoothly or continuously from the central portion 64 in the extended direction. Therefore, the peripheral light luminous region 13 provided by the light output face 63 can appear with the gradation which decreases luminance smoothly without steps from the central portion 64 to each of both the end portions 65a and 65b.

Further, in the present embodiment, the width in the tip tapering regions 63a and 63b of the light output face 63 outputting light becomes gradually smaller or narrower towards each of both the end portions 65a and 65b; thus, the light quantity outputted from the tip tapering regions 63a and 63b accordingly decreases continuously and certainly as going towards each of both the end portions 65a and 65b. Thus, the light quantity reduction function for the output light due to the shape of the light output face 63 cooperates with the attenuation function due to the attenuation portion 62; this can decrease the light quantity of the output light still more smoothly and certainly as going towards each of both the end portions 65a and 65b. This can certainly express a smooth luminance reduction in the gradation and achieve an advantageous outstanding design which expresses that the peripheral light luminous region 13 seems to disappear naturally at each of both the end portions.

Further, in the present embodiment, each of the end regions 61a and 61b of the light input face 61 is covered with the input-light shielding portion 81; thus, the light becomes difficult to enter the end regions 61a and 61b. This can certainly reduce the light quantity outputted from the vicinity of the end portions 65a and 65b located in the front direction FD of the end regions 61a and 61b. Thus, the light shielding function by the input-light shielding portion 81 cooperates with the attenuation function due to the attenuation portion 62; this can decrease the light quantity of the output light still more smoothly and certainly as going towards each of both the end portions 65a and 65b. This can certainly express a smooth luminance reduction in the gradation and achieve an advantageous outstanding design which expresses that the peripheral light luminous region 13 seems to disappear naturally at each of both the end portions 65a and 65b.

Further, in the present embodiment, the light emitted from the indicator light source 43 is permitted to be diffused by the indicator-light guide member 50 and then enter the light input face 61. This uniforms the unevenness of light which is going to enter the coloring transmissive member 68; thus, the gradation of the peripheral light luminous region 13 formed due to the attenuation by the attenuation portion 62 can change the luminance much more smoothly.

Further, in the present embodiment, the light output face 63 is curved in an arc-like shape along the outline or outer perimeter of the display region 11; thus, the peripheral light luminous region 13 is provided to surround the outer perimeter or circumference of the display region 11 and decorates the display region 11. Therefore, the design of gradation which decreases luminance smoothly can improve the outer appearance of the combination meter 100 effectively.

Further, in the present embodiment, the light output face 63 is formed on the summit face 66a of the arc-like projection wall 66 to be a narrow long region. This configuration makes it difficult for a conventional printing or transfer technique to form the light output face 63 that demonstrates the accurate gradation of light and shade in an extended direction. Furthermore, when the summit face 66a is inclined, the gradation by printing is more difficult to form.

In contrast, the present embodiment can provide a featured configuration of a three-dimensional design expressing gradation using attenuation function of the attenuation portion 62; the gradation is applied to the peripheral light luminous region 13 served as by the light output face 63 provided by the summit face 66a. Such a featured configuration clearly differs from a two-dimensional design formed by a conventional printing or transfer technique. The peripheral light luminous region 13 can thus demonstrate certainly an advantageous effect which charms a viewer. Such an advantageous effect can be further improved when the summit face 66a is provided to be inclined.

Yet further, in the present embodiment, the light input face 61 and the light output face 63 are formed in the coloring transmissive member 68 made of semi-transmissive smoked material; the attenuation portion 62 is provided in between the light input face 61 and the light output face 63. Such a configuration using the smoked material can prevent the complication in the configuration about the luminescence of the peripheral light luminous region 13, while providing suitably the gradation excellent in an outer appearance.

Other Embodiments

Up to this point, description has been given to the embodiment of the present disclosure. However, the present disclosure is not limited to the above embodiment, and it can be variously embodied within a scope not departing from essential points of the present disclosure.

The above embodiment uses the coloring transmissive member 68 which is smoked material colored with gray. However, the color applied to the coloring transmissive member is not limited to gray. In addition, the color applied to the coloring transmissive member and the color of the indicator light source may be combined; this enables the peripheral light luminous region 13 to change in both a luminance and a luminescent color smoothly.

For example, in a first modification of the above embodiment, the coloring transmissive member may be colored with yellow. In addition, the luminescent color of the indicator light source may be blue. In the first modification, a filtering effect due to the coloring transmissive member can provide an attenuation function more to the light having smaller wavelength bands. This can maintain the light outputted from a central portion of the light output face to be highly luminescent and exhibiting a blue color approximated to the light source color. In contrast, the light outputted from a tip tapering region of the light output face reduces luminance more significantly and changes closer towards a pale blue color as going closer towards each of the end portions. Thus, the blue colored gradation appears in the peripheral light luminous region as mentioned above.

For example, in a second modification of the above embodiment, the coloring transmissive member may be colored with green. In addition, the luminescent color of the indicator light source may be red. In the second modification, the light outputted from the light output face reduces the luminance while changing from red to orange depending on moving from the central portion to each of end portions. For example, in a third modification of the above embodiment, the coloring transmissive member may be colored with blue. In addition, the luminescent color of the indicator light source may be yellow. In the third modification, the light outputted from the light output face reduces the luminance while changing from yellow to yellow-green depending on moving from the central portion to each of end portions.

In addition, in a fourth modification, the coloring transmissive member may be colored with gray while containing a yellow fluorescence agent. In addition, the luminescent color of the indicator light source may be blue. In the fourth modification, the light outputted from the light output face reduces the luminance while gradually changing from blue via pale blue to white depending on moving from the central portion to each of end portions.

In the above embodiment, the width of the light output face 63 is decreased as going towards each of the end portions 65a and 65b. However, the shape of the light output face may be changed suitably. For example, the width of the light output face may be constant up to each of both the end portions. In addition, in the above embodiment, the reduction in width is started from a border portion between the central portion 64 and each of the tip tapering regions 63a and 63b. However, the position starting such reduction may be changed suitably. For example, the central portion 64 which maintains the width constant may be omitted; the reduction in width may be started from the center of the light output face in the extended direction.

In the above embodiment, the thickness of the attenuation portion 62 is increased in both the end portions 62a and 62b. However, the position which starts the increase in the thickness of the attenuation portion 62 may be changed suitably. For example, the central portion 62c which maintains the thickness constant may be omitted; the increase in thickness may be started from the center of the attenuation portion 62 in the extended direction.

In the above embodiment, the light-input shielding portion 81 is formed of a case member which constitutes the housing 80. Such a light-input shielding portion may be formed by light-shielding printing etc. given to the end regions 61a and 61b, for example. In addition, the input-light shielding portion may be omitted; the light may enter the end regions 61a and 61b.

In the above embodiment, the indicator-light guide member 50 guides the light into the light input face 61. The indicator-light guide member 50 or a light guide member may be changed suitably. For example, a light guide member may be configured to receive the light from a plurality of indicator light sources and then output the light to a light input face of a semi-transmissive prism. Alternatively, a plurality of light guide members may be used to guide the light to a light input face. Furthermore, any light guide member may be omitted; the light emitted from the light source may enter a light input face directly.

In the above embodiment, the peripheral light luminous regions 13 are located at the right and left sides of the display region 11. However, the shapes, arrangement, or number of peripheral light luminous regions 13 may be changed suitably. For example, a peripheral light luminous region may be provided in a belt-like shape extended in a horizontal direction above a tachometer and a speedometer which are arranged in a row. Alternatively, a peripheral light luminous region may be formed within the display region 11 such as a tachometer.

In the above embodiment, the light output face 63 is formed in the summit face 66a that is an inclined face of the arc-like projection wall 66. However, the shape of the light output face 63 may be changed suitably. For example, a light output face may be formed in a plane identical to a front face of the output-light shielding portion 69a. Furthermore, a light output face may be provided with an uneven texture for diffusing the output light.

In the above embodiment, the semi-transmissive prism 60 is formed of two color molding. The coloring transmissive member and the light shielding member may be molded separately and then assembled into a single body. In addition, the member which forms a light output face or a light input face may be provided independently of the attenuation portion. Furthermore, as long as the attenuation can be changed depending on the thickness of the attenuation portion, the coloring applied to the coloring transmissive member may be provided to be non-uniform.

In the above, an embodiment of the present disclosure is applied to an indicator display of a tachometer using ambient light in a combination meter mounted in a vehicle, for instance. The ambient display may provide a driver with a pale or weak light to permit the driver to recognize it in a peripheral visual field. However, the present disclosure may be applied to a usual luminous display that provides a sharp indication without need to be limited to an ambient display. Furthermore, without need to be limited to an indicator display for a tachometer, the present disclosure may be applied to an indicator display such as a speedometer, a power meter, and a fuelometer. Furthermore, the present disclosure may be applied to a display apparatus generally used for various consumer appliances or various transport machines without need to be limited to a vehicular display apparatus.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A display apparatus having a front and a rear, the display apparatus including (i) a display region to display information towards a display direction that is along a direction from the rear to the front, and (ii) a light luminous region that is luminous by outputting light towards the display direction, the light luminous region being arranged in an area adjacently along an outer perimeter of the display region, both the display region and the light luminous region being arranged to be viewed by a viewer facing the front, the display apparatus comprising:
an indicator light source to emit light that is to be outputted from the light luminous region;
a transmissive member made from light transmissive material to be arranged in the area adjacent the outer perimeter of the display region to transmit light emitted from the indicator light source to cause the light luminous region to illuminate the area adjacent the outer perimeter of the display region; and
an output-light shielding portion formed in a perimeter of the transmissive member to prevent the transmissive member from outputting light,
the transmissive member comprising:
a light input face that receives the light emitted from the indicator light source;
a light output face that has a belt-like extended shape having two extended end portions in an extended direction, the extended direction being defined as being along the outer perimeter of the display region and orthogonal to the display direction, the light output face forming the light luminous region viewed by the viewer by outputting the light inputted via the light input face; and
an attenuation portion formed between the light input face and the light output face to attenuate the light transmitting from the light input face to the light output face,
wherein:
the belt-like extended shape of the light output face has a width, the width being defined as being orthogonal to the extended direction and orthogonal to the display direction,
the width decreasing in the extended direction from a midway point of the two extended end portions to each of the two extended end portions of the light output face; and
the attenuation portion has a thickness between the light input face and the light output face, the thickness being defined as being orthogonal to the extended direction and along the display direction,
the thickness increasing in the extended direction from the midway point of the two extended end portions to each of the two extended end portions of the light output face,
the transmissive member further including:
a projection wall included in the attenuation portion, the projection wall projecting more towards the display direction than the output-light shielding portion, the output-light shielding portion being formed in the perimeter of the transmissive member to prevent the transmissive member from transmitting light,
the projection wall having a summit face that inclines with respect to a virtual plane orthogonal to the display direction, the summit face serving as the light output face.

2. The display apparatus according to claim 1, further comprising:
an input-light shielding portion covering each of end regions of the light input face to prevent light from entering each of the end regions, each of the end regions of the light input face opposing each of the two extended end portions of the light output face via the attenuation portion.

3. The display apparatus according to claim 1, further comprising:
a light guide member arranged to face the light input face, the light guide member diffusing light emitted from the indicator light source while guiding the light to the light input face.

4. The display apparatus according to claim 1, wherein the light output face is curved in an arc-like shape along the outer perimeter of the display region.

5. The display apparatus according to claim 1, wherein the transmissive member is formed of light semi-transmissive material which attenuates light transmitting.

6. A display apparatus having a front and a rear, the display apparatus including (i) a display region to display information towards a display direction that is along a direction from the rear to the front and (ii) a light luminous region disposed in an area adjacently along an outer perimeter of the display region, the light luminous region being luminous by outputting light, both the display region and the light luminous region being arranged to be viewed by a viewer facing the front, the display apparatus comprising:
a light source to emit light that is to be outputted from the light luminous region;
a light guide member guiding and diffusing the light from the light source,
a transmissive member made from light transmissive material, the transmissive member including
a light input face aligned with the light guide member to receive the light via the light guide member,
a light output face that has a belt-like extended shape having two extended end portions in an extended direction, the extended direction being defined as being along the outer perimeter of the display region and orthogonal to the display direction, the light output face forming the light luminous region by outputting the light inputted via the light input face, and
an attenuation portion formed between the light input face and the light output face to attenuate the light transmitting from the light input face to the light output face;
a first input-light shielding portion and a second input-light shielding portion each being formed between the light guide member and the transmissive member to prevent the light via the light guide member from entering the transmissive member; and an output-light shielding portion formed in a perimeter of the transmissive member to prevent the transmissive member from outputting light, wherein:

the belt-like extended shape of the light output face has a width, the width being defined as being orthogonal to the extended direction and orthogonal to the display direction,
   the width decreasing in the extended direction from a midway point of the two extended end portions to each of the two extended end portions of the light output face;

the attenuation portion has a thickness between the light input face and the light output face, the thickness being defined as being orthogonal to the extended direction and along the display direction,
   the thickness increasing in the extended direction from the midway point of the two extended end portions to each of the two extended end portions of the light output face;

the transmissive member has an extended shape along the extended direction of the light output face, the extended shape having two end regions of a first end region and a second end region on the light input face,
   the transmissive member being inclined more to the rear with respect to the light output face as being extended from a midway point between the first end range and the second end range to each of the first end region and the second end region;

the light guide member has an extended shape along the extended direction of the light output face, the extended shape having two end regions of a third end region opposing the first end region of the transmissive member and a fourth end region opposing the second end region of the transmissive member,
   the light guide member being inclined more to the rear with respect to the light output face as being extended from a midway point between the third end range and the fourth end range to each of the third end region and the fourth end region;

the first input-light shielding portion is sandwiched between the first end region of the transmissive member and the third end region of the light guide member; and the second input-light shielding portion is sandwiched between the second end region of the transmissive member and the fourth end region of the light guide member, the transmissive member further including:

a projection wall included in the attenuation portion, the projection wall projecting more towards the display direction than the output-light shielding portion formed in the perimeter of the transmissive member to prevent the transmissive member from outputting light,
   the projection wall having a summit face that inclines with respect to a virtual plane orthogonal to the display direction, the summit face serving as the light output face.

7. A display apparatus having a front and a rear, the display apparatus including (i) a display region to display information towards a display direction that is along a direction from the rear to the front and (ii) a light luminous region disposed in an area adjacently along an outer perimeter of the display region, the light luminous region being luminous by outputting light, both the display region and the light luminous region being arranged to be viewed by a viewer facing the front side, the display apparatus comprising:

a light source to emit light that is to be outputted from the light luminous region;

a light guide member guiding and diffusing the light from the light source;

a transmissive member made from light transmissive material, the transmissive member including
   a light input face aligned with the light guide member to receive the light guided by the light guide member,
   a light output face that has a belt-like extended shape having two extended end portions in an extended direction, the extended direction being defined as being along the outer perimeter of the display region and orthogonal to the display direction, the light output face forming the light luminous region by outputting the light inputted via the light input face, and
   an attenuation portion formed between the light input face and the light output face to attenuate the light transmitting from the light input face to the light output face; and a first input-light shielding portion and a second input-light shieling portion each covering the light input face of the transmissive member to prevent the light guided by the light guide member from entering the light input face, wherein:

the belt-like extended shape of the light output face has a width, the width being defined as being orthogonal to the extended direction and orthogonal to the display direction,
   the width decreasing in the extended direction from a midway point of the two extended end portions to each of the two extended end portions of the light output face; and the attenuation portion has a thickness between the light input face and the light output face, the thickness being defined as being orthogonal to the extended direction and along the display direction,
   the thickness increasing in the extended direction from the midway point of the two extended end portions to each of the two extended end portions of the light output face, the light input face of the transmissive member has an extended shape along the extended direction of the light output face, the extended shape having two end regions of a first end region and a second end region;

the light guide member has an extended shape along the extended direction of the light output face, the extended shape having two end regions of a third end region opposing the first end region of the light input face and a fourth end region opposing the second end region of the light input face; and the first input-light shielding portion is sandwiched between the first end region of the light input face and the third end region of the light guide member while making contact with each of the first end region of the light input face and the third end region of the light guide member; and the second input-light shielding portion is sandwiched between the second end region of the light input face and the fourth end region of the guide member while making contact with each of the second end region of the light input face and the fourth end region of the light guide member.

8. The display apparatus according to claim 7, wherein the light output face is curved in an arc-like shape along the outer perimeter of the display region.

9. The display apparatus according to claim 7, wherein the transmissive member includes a projection wall included in the attenuation portion, the projection wall projecting more towards the display direction than an output-light shielding portion, the output-light shielding portion being formed in a perimeter of the transmissive member to prevent the transmissive member from transmitting light; and
the projection wall has a summit face which provides the light output face.

10. The display apparatus according to claim 9, wherein the summit face is provided to incline with respect to a virtual plane orthogonal to the display direction.

11. The display apparatus according to claim 7, wherein the transmissive member is formed of light semi-transmissive material which attenuates light transmitting.

12. The display apparatus according to claim 7, wherein the luminous region having the belt-like extended shape adjacently along the outer perimeter of the display region is arranged in each of a left-side area and a right-side area, the left-outside area being viewed from the viewer to be located left outside of the display region, the right-outside area being viewed from the viewer to be located right outside of the display region.

* * * * *

UNITED STATES PATENT AND TRADEMARK OFFICE
CERTIFICATE OF CORRECTION

PATENT NO. : 9,435,531 B2
APPLICATION NO. : 14/277201
DATED : September 6, 2016
INVENTOR(S) : Yasuhiro Kobayashi et al.

It is certified that error appears in the above-identified patent and that said Letters Patent is hereby corrected as shown below:

On the Title Page

At Column 1, Item (73) Assignee, Line number 2, after "(JP)", insert --; Honda Motor Co., Ltd., Tokyo (JP)--.

Signed and Sealed this
Twenty-seventh Day of December, 2016

Michelle K. Lee
*Director of the United States Patent and Trademark Office*